May 12, 1970   F. E. WEICK   3,511,455
RETRACTABLE LANDING GEAR SYSTEM FOR AIRCRAFT
Filed May 23, 1968   3 Sheets-Sheet 1

FIG. 1

INVENTOR
FRED E. WEICK

BY Stevens, Davis, Miller & Mosher
ATTORNEYS

INVENTOR.
FRED E. WEICK
BY
Stevens, Davis, Miller & Mosher
ATTORNEYS.

FIG. 4

INVENTOR
FRED E. WEICK

United States Patent Office 3,511,455
Patented May 12, 1970

3,511,455
RETRACTABLE LANDING GEAR SYSTEM FOR AIRCRAFT
Fred E. Weick, Vero Beach, Fla., assignor to Piper Aircraft Corporation, Vero Beach, Fla., a corporation of Pennsylvania
Filed May 23, 1968, Ser. No. 731,508
Int. Cl. B64c 25/18
U.S. Cl. 244—102    18 Claims

ABSTRACT OF THE DISCLOSURE

The disclosure herein is directed to a system providing improved safety in the retraction and extension of landing gear for airplanes. A special feature of the system is the provision of a free-fall emergency landing gear whereby should the pilot overlook proper gear position at the time of landing, the gear will automatically extend and lock without pilot attention. The described system is hydraulic and it has many features of a safety and warning type. In the main, however, the objectives of the invention are accomplished basically by combining air velocity pressure effects resulting from airspeed and the slipstream in a single device, and then translating such pressure into mechanical motion by a pressure transference device integrated into the hydraulic system of the landing gear. Translation of the pressure effects is such that the gear cannot be retracted on take-off until normally safe flying speed is attained. The air velocity effects are utilized to accomplish emergency free-fall of the gear below a selected speed at the time a landing is contemplated. Included in the system is a means manually operable by the pilot, termed "override means," for placing and maintaining the gear in either retracted or extended position at his choice irrespective of airspeed or power.

---

The invention described herein relates to retractable landing gear for aircraft. More particularly, this invention concerns control systems for such landing gear whereby to assure the proper position of the landing gear under all normal take-off and landing situations, and especially to assure that the landing gear will be fully extended and in proper position for landing regardless of possible pilot error. The invention involves and utilizes the discovery that slipstream velocity effects are especially advantageous to these objectives. By way of reference the system is termed a pilot back-up gear extender system. In the latter respect, the present system is automatic and, except by deliberate pilot action, the craft cannot be landed in gear-up position. The embodiment of the invention described herein with particularity is readily adaptable to existing aircraft.

Although the primary object of this invention is to prevent by an automatic fail-safe system the serious occurrences that planes will be landed in gear-up position, within this invention a gear operating system is available such that by the elimination of certain added pilot controls which are included in consideration of pilot preference, or psychology, the entire operation of the landing gear may occur completely automatically. Thus, according to the entirety of this invention, an airplane may be taken off and its gear automatically retracted and retained in retracted position throughout the flight; and then when the airplane is trimmed for landing, the landing gear automatically will extend into proper position, both operations taking place without the need for pilot attention in any respect.

Further, this invention provides means available to the pilot by which the system may be effectively overriden so as to render the operation of the landing gear wholly and solely responsive to the pilot's control.

Although the invention is indicated to permit a fully automatic operation, the invention as illustrated and as more particularly described in this specification includes a cockpit panel switch that provides the pilot with selective control of the gear operation as completely as if its operation were not potentially fully automatic, while also assuring that should the pilot fail in his responsibility for gear operation, the gear will automatically extend and prevent a gear-up landing. Thus, in the embodiment herein particularly illustrated, which is designed for commercial installation, the pilot is provided with a panel switch which must be operated to "gear-up" position before the gear will retract; and the same switch is normally intended to be moved to a "gear-down" position by the pilot when the pilot decides that the gear should be in the down position. In the latter situation, assuming that the pilot moves the switch to the gear-down position, the system will go into operation in response to pilot's selection and lower the gear into locked position. As will be understood, therefore, the embodiment of the invention as illustrated and particularly described herein affords all elements of conventional landing gear operation forming a part of the present day pilot's routine, and preferred from the standpoint of present commercial acceptance. A pilot might fly an airplane equipped with the present system without ever needing to know that it is indeed automatic in any respect; however, absent an emergency situation where the pilot deliberately chooses to land the plane with the gear up, in which case he will override the system, the pilot cannot land the aircraft with the gear up, even if he fails to operate the panel switch, because the automatic back-up characteristics of the system results.

Notwithstanding the fact that modern airplanes are equipped with visual light indicators and signal horns, calling the pilot's attention to the fact that his landing gear is in an improper position, for example, in a gear-up position at the time he is otherwise set for landing, and he may also be warned by the tower that his gear is not extended, many hundreds of small crafts are landed each year in the gear-up position. The need for a simple foolproof system has become essential. On the other hand, pilot psyche is such that a great deal of resistance to a fully automatic system, that is one which takes the control out of his hands substantially completely and compels him to rely upon a mysterious automatic system, is resisted. Such resistance is not without a measure of logic and is by no means a mere matter of pilot stubbornness. The mental attitude is merely such that pilots tend to have adequate confidence in their own operation of the craft and, therefore, wish it to be totally responsive to their own choices according to flight conditions as they are encountered. Moreover, years of mental conditoning to a sequence of motions in aircraft operations is an important resistance factor. The pilot tends to stabilize the sequence more and more and not upset it to an extent which may be seriously disconcerting under stress conditions. Thus far in their approach to aircraft operation, pilots, taken as a group, have remained more or less reluctant to transfer such confidence to inanimate automated equipment. For this reason, the present system, though having the automatic gear-down safety feature, and which in fact as pilot acceptance of automatic operations grows can be widely employed as a fully automatic system, thus retracting and extending the gear entirely properly under all normal flight conditions without pilot's attention, the system herein particularly described integrates its automatic character with additional pilot control means permitting the pilot his normal choice, as well as a deliberate override of all its automatic character.

The system herein must be regarded as somewhat anomalous, in that one provides a potentially fully automatic system and then proceeds to render it to some extent redundant and seemingly without automatic character. Yet, the aircraft does not fly itself apart from the pilot, just as the pilot does not fly without the aircraft. Air transportation is a matter of both the plane and the pilot, and it is, therefore, required that the characteristics of both be given due regard in accomplishing a given objective. Disregard of one or overemphasis of the other may well defeat an otherwise apparently sophisticated solution to a difficult problem.

Insofar as the system of the invention as herein shown is in fact automatically operative, it may be described in a very general way as involving a hydraulic system, internally pressurized by a reversing, electric motor-driven pump for gear operation, which is dependent upon a differential ram pressure operated valve for its characteristic operability. Although the system includes a variety of valves, this particular valve and its operation is at the heart of the system. For convenience, it may be termed as the "critical valve." The actuating ram pressure is received by a pitot-static tube (or similar device) located in the slipstream flow and translated to mechanical motion by way of an interconnected pressure transference device, whereby the valve is operated. The particular valve is integrated in the system in such a way that, so long as it is closed, the hydraulic system can develop its gear-operating pressure to actuate movement either up or down, and so long as it is open the gear is down (and locked) and cannot be brought up. As aforesaid, this valve operates in response to external pressure generated by air movement relative to the aircraft, including the slipstream. This air movement and the resulting pressure may derive from glide speed with little or no throttle (no slipstream) or it may derive from full throttle and attained air speed.

Assuming the aircraft to be in normal flight at any speed above for example, 105 m.p.h. (this speed being chosen in relation to performance characteristic of particular commercial craft and the pressure system can be adjusted accordingly) the air movement is such as to provide pressure high enough to maintain the valve closed and the system fully operative. Thus, when the power-off glide speed falls for landing, the valve opens and the gear automatically falls. As regards gear up on take-off, when take-off speed reaches 85 m.p.h., the full throttle slipstream together with the pressure of the movement of the craft at 85 m.p.h. closes the valve and renders the system operable for either up or down position.

The motor and pump are chosen for rapid pressure build up and the gear movement may be substantially as rapid as desired. The motor directly drives the hydraulic pump, and the pump reverses with the motor. Thus, fluid is delivered in one direction for gear up and another for gear down position, the fluid passing to hydraulic pistons connected to the separate landing gear assemblies in any suitable manner.

With the foregoing as brief introductory background concerning the "critical" valve and its primary association, the invention and particular embodiment herein may be considered with more insight from the outset, though it will be necessary to repeat the foregoing together with much other discussion and detail.

Although the invention described herein is applicable to a wide variety of aircraft, the description herein provided of the actual operation under flight conditions is with respect to a single engine, propeller-driven small craft normally having a take-off speed of 65 to 70 miles an hour and a landing speed of about the same.

Before proceeding to a detailed description of the apparatus in relation to the drawings, it is considered to be important to decsribe somewhat fully the various functional aspects of the new system, i.e., its operational responses to flight circumstances and in what manner such responses come about, i.e., whether by pilot action or by inherent response in the system. In this way, a more complete assessment of the entire subject can be gained, without regard to the entirety of meticulous detail necessarily involved in a system of such functional capabilities. Such discussion is undertaken immediately below.

In relating the present inventive gear-operating system to the aforementioned type of aircraft, and as indicated above, the system is designed in such manner as to maintain the landing gear in extended position following take-off until a flying speed of approximately 85 m.p.h. is reached, such speed providing a margin of approximately 20 miles per hour above take-off speed, which generally assures that the aircraft is well airborne and, except in emergency situations would not touch the ground again prior to a planned landing. This take-off speed is automatically higher under reduced power and increasing altitude take-off conditions due to inherent characteristics of the system.

As indicated above, however, the landing system does not automatically retract, though it is important to note that it may be caused to do so in practice of the invention by the elimination of the panel switch, which, as the invention is particularly illustrated, must be brought to the up position by the pilot, thereby completing the related electric circuitry to the power source for the hydraulic system. At a speed of approximately 85 m.p.h., the entire hydraulic system is in readiness for taking the gear up; however, the panel switch breaks the circuit to the driving motor and it will be understood that elimination of the gear-up switch and completion of circuitry to the motor would automatically take the gear up. In actual flying, the pilot may, at his choice set the panel switch to the up position at any time prior to take-off. If he does so, the gear will retract without further attention upon reaching the aforesaid speed of approximately 85 m.p.h.

If for any reason it is desirable or necessary to have the gear retract at a speed lower than 85 m.p.h., a pilot override means briefly mentioned above may be employed to bring the gear up immediately upon leaving the ground, the hydraulic system functioning to do so. It may be mentioned that the present system is not entirely independent of the so-called squat-switch which is provided on practically all, if not all power-operated retractable gear airplanes for the purpose of inactivating the retracting mechanism, whatever type it might be, until such time as the airplane leaves the ground. This type of switch is opened by the weight of the airplane as it settles on the landing gear so that the power source from gear movement is inactivated at all times when the craft is on the ground. The present system is in no way controlling the squat-switch and therefore it cannot be overridden by the pilot override means.

If after such a take-off and upon obtaining the approximate speed of 85 m.p.h. it should become desirable to land at once, the gear may itself return to extended locked position by reason of the automatic character of the system, or the pilot may actuate or override the system and return the gear himself. In this connection, if the pilot were merely to pull the throttle full back for landing, the landing gear will extend immediately since slipstream pressure is absent; or the pilot may throw the "gear down" panel switch and the gear will extend, even through under full slipstream, under the power of the hydraulic system in approximately six seconds, though it can be adjusted to put the gear down in a shorter or longer time. If a speed of about 150 m.p.h. or above has been reached, then panel switch actuation is necessary if the gear is to be extended, unless gliding speed is allowed to drop below this speed; also, if there is a failure involving the landing system, the override means may be employed. Similarly, if desired, the override means may be employed to maintain the gear up for as long as desired so long as sufficient pressure remains in the hydraulic system, and the plane may be brought in for a "belly landing" if necessary.

As will be understood, on take-off the slipstream is under full open throttle so that it is delivering its maximum pressure effects. Thus, if upon attaining a speed of 85 to 90 m.p.h. it becomes desirable to land immediately, in which case the throttle will shortly be reduced or returned to full off position, the only effective pressure active upon the system will be that from the attained flight speed. Since in the range of 85–105 m.p.h. slip-stream pressure is also necessary to maintain the system operative, the hydraulic system permits the gear to extend at once, i.e., the critical valve opens.

A portion of the substance of the foregoing discussion is applicable to normal landing conditions. For example, taking the case of where a plane has been in flight under normal conditions and the time has come to land it, and the pilot cuts the power as the plane approaches the field but does not actaute the gear-down switch, depending upon the extent to which the engine is throttled back, coupled with the glide speed of the aircraft, the gear may or may not extend at once. If the engine is throttled back to idle, the gear will extend if the airspeed is below 105 m.p.h. If it is above 105 m.p.h., the gear will remain retracted until speed drops below 105 m.p.h. and then extend immediately and lock itself in position. In the event that the pilot maintains sufficient power on the engine to provide an approach landing speed of, for example, 90–95 m.p.h., which he may choose to do, the pressure effects of the slipstream combined with the pressure effects of airspeed can hold the gear in up position for a longer period of time. Thus, actual airspeed may have to fall somewhat below the 105 m.p.h. point to offset the pressure effects of the reduced slipstream in the course of reaching such approach speed. However, in no event would the gear remain at up position below a speed of 85 m.p.h. regardless of pressure from the slipstream because of the fact that an airspeed of 85 m.p.h. delivering its own pressure effects, combined with a full open throttle, thus delivering maximum pressure effects of the slipstream, are required in order to bring the landing gear up in the first place. In other words, assuming the system to be operating without fault, the gear will not go to its retracted position, and it will not maintain its retracted position below 85 m.p.h. under any conditions except where the pilot deliberately chooses to override the system and take or hold the landing gear up, as in an emergency situation. The override means is directly associated with the pressure transference device and it is effective to control the position of the critical valve. As will be understood, the emergency override means is effective immediately upon actuation and release for either up or down position. Usually, the use of the override means is not necessary in extending the gear; rather this is accomplished by simply moving the panel switch to down position. The override for gear extension is especially important if difficulty develops in the system such as to hold the pressure maintained valve in closed position when it should release.

In general, and in addition to the above, the system which operates in accordance with the above discussion includes a variety of electrical and hydraulic elements. The hydraulic system is related to the gear so as to deliver fluid alternatively to the up or down side of hydraulic pistons which are connected to the landing gear assembly. The hydraulic system is so designed that the gear is maintained in retracted position under the internal pressure of the hydraulic system, whereas it is normally under zero pressure in the extended position. Pressures such that the gear stays in retracted position is maintained therein (in contrast to pressure generation) by the "critical" valve, which valve is in itself held in closed position by ram pressure from a pitot-static tube located on the outside of the aircraft directly in the propeller slipstream. The said valve is connected to a diaphragm type of pressure-transference device (although various similarly useful devices may be substituted) which diaphragm receives the ram pressure. When the ram pressure becomes high enough that the resistance (spring applied) of the diaphragm is overcome, the valve, which is responsive to the diaphragm movement, closes. At the same time that this valve closes, the diaphragm effects the closing of a related electric switch that sets the power source for delivering gear up pressure into motion. Pressure builds up substantially immediately to lift the gear. With sufficiently reduced ram pressure, the valve and switch open, pressure drops and power stops. The weight of the gear then takes the gear down, moving fluid in the system to the opposite sides of the pistons.

As indicated above, the hydraulic power source, namely an electric motor driven high-speed, gear-type pump is connected into the electrical system of the craft so that the pilot is given normal control over the hydraulic system except that he cannot maintain the gear in retracted position merely by flipping the gear up switch on the cockpit panel. This, he must do in order to retract the gear; however, and although the panel switch provides for a gear down activating position normally activating the pump and applying hydraulic pressure within the gear extension chambers, should the pilot for any reason fail or not choose to place the switch in gear down position, the gear will automatically free-fall of its own weight to extended position immediately when the ram pressure falls below that minimum which is required for maintenance of pressure in the hydraulic system.

As should be appreciated at this point of the discussion of the present invention, the particular embodiment thereof which is described herein is deliberately constructed to operate as a back-up system for the pilot, thus serving to guard against pilot error as often occurs under conditions of stress in making landings.

The described system is deliberately so designed in order to accommodate pilot psychology as well as established pilot routine as such has developed in the past. On the other hand, it should now be more clearly appreciated that the system may be rendered completely automatic by simple modifications in the electrical circuitry. As more and most pilots come to understand the design of the described system and its substantially fool-proof operation, they may eliminate the panel switch and choose the totally automatic alternative.

In addition to the foregoing description of basic function and operation, the present system is electrically associated with panel lights and alarms serving to indicate gear conditions and warn the pilot of improper position. Thus, the cockpit panel is provided with three (3) lights, each separately related to a separate gear of the tricycle landing gear construction. Each indicating bulb is connected so as to light up upon final locking engagement of the gear when it is in gear down position. For this purpose, dual purpose switches are associated with the landing gear at the point of final latching, one purpose being to close the circuitry to the light itself and the other being to maintain electrical continuity to the pump power unit, that is the electric motor which drives the hydraulic system. As each of the landing gears latches into position, its corresponding panel bulb lights up and the electrical continuity to the motor through that switch is broken at the same time. As will be understood, therefore, if any unit fails to latch into position or stops in its transit path, then the corresponding bulb will not light and circuitry to the motor will not be broken. This being the case, the pump will continue to deliver pressure in the system in an attempt to complete a proper gear extension. When all three panel bulbs are lighted, the system shuts down and it is assured that all three units are certainly locked.

The circuitry of the immediately described panel lights is connected with a further panel light showing the gear to be "in transit" which "gear in transit bulb" remains lighted until latching position is reached. Also, each gear unit is provided with "gear up limit switches" which are actuated only when each is in proper position in the well, such switches serving to actuate the "in transit" bulb individually until the gear is in position. Also, an alarm horn and red light are similarly connected into the electric circuitry so that they continue to alarm until all gear is securely locked.

The pilot is first alerted to a dangerous gear-up position when he throttles down upon approaching a final glide to the runway. The movement of the throttle actuates a switch closing the circuitry to the alarm signals. This circuitry is not broken and the horn continues to sound until the gear is securely locked.

As the inventor herein, I am aware that a substantial number of similar landing gear systems have been proposed heretofore, and some similar systems have been operated. For example, others have provided a control upon the landing system by interrelating the airspeed and engine r.p.m. whereby to retract and extend the gear upon certain predetermined take-off and landing conditions. At least one system has involved controlling the flow in a hydraulic system in accordance with engine manifold pressure in combination with airspeed. It also has been proposed to utilize the throttle setting as a measure of engine speed in a system involving also airspeed control. However, and entirely aside from other disadvantages which such systems have involved, heretofore it is not believed that anyone has discovered the highly desirable arrangement of this invention involving the use of a single slipstream pressure sensing unit as a direct measure of both airspeed and engine speed and thereupon deliver the sensed pressure to a hydraulic system as a single and sole means for control of its basic functioning. The advantage of the present arrangement is immediately apparent by reason of the fact that all are aware of the importance of simplicity of and fewness of operating parts. In other words, in any situation where an operation can be performed with one part as against two or more parts, the choice is a matter of automatic occurrence, unless elements of economy completely override; however, the present system affords an economic advantage rather than any disadvantage at all. Additionally, it is not believed that within such a simplified and advantageous system as provided herein that the pilot has been provided with a back-up system wherein he may employ it as such or render it completely automatic at his choice, while also in either case having the advantage of a complete override upon the entire system under any conditions that he may choose.

Figure 1:
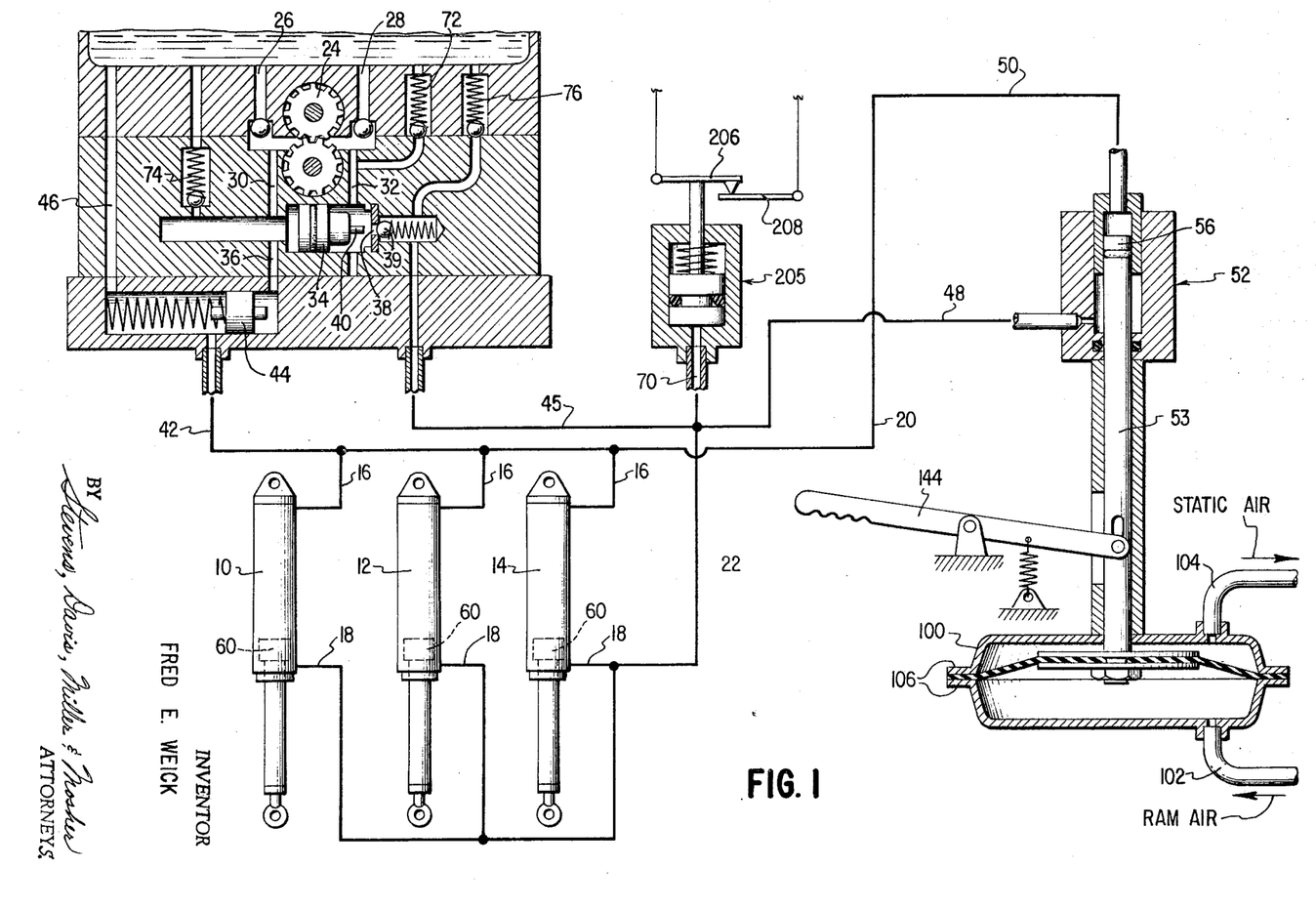
FIG. 1 is a somewhat schematic showing of the hydraulic system, including the pump and flow control therefor, together with a simulated, simplified pressure transference system.

In considering the invention in detail, reference is first made to the hydraulic system as shown in FIG. 1. While considering FIG. 1, reference is necessarily made to other figures herein since their showings must be interrelated with FIG. 1 for the best understanding of the description.

Considering the application of the invention to a plane having a tricycle landing gear, the gear operating system includes three hydraulic jacks 10, 12 and 14, connected via the jack pistons to their respective gear, each of which is connected thru fluid pressure lines 16 for gear-down action and pressure line 18 for gear-up action, the said lines receiving and discharging fluid thru lines 20 and 22 respectively. As will be observed these lines connect into the pump storage portion of the system. Referring to the latter, numeral 24 denotes a two directional fluid gear type pump, driven by a high speed electric motor (e.g. 5000 r.p.m. and providing pressure of from 1600–2000 p.s.i., such motor not being shown in this figure) and connected to a storage source of hydraulic fluid thru ports 26 and 28. Ports 26 and 28 are provided with ball valves which operate to open and close depending upon the direction of fluid draught by the pump. As will be observed, pump 24 is provided with delivery lines 30 and 32 which connect with opposite ports of the chamber of a shuttle valve 34, outlet ports 36 and 38 delivering fluid therefrom to the hydraulic lines. Shuttle valve 34 operates to open outlet port 38 depending upon the direction of fluid delivery from the pump. As shown, port 38 is provided with a spring urged ball valve 39, the function of which is to maintain port 38 closed except when fluid is moving against it under pump pressure from line 32 and/or when it is moved to open position by pin 40, which pin is a part of the shuttle valve and moves as does the valve itself. As will be observed, when fluid is being delivered thru port 36, as is the case when the gear is being power extended, pin 40 is at the extreme right position of its movement, moving the ball of valve 39 away from port-closing position, and port 38 is thus opened by left to right movement of the pin of the shuttle valve. Thereby fluid displaced from the cylinders by pump pressure in moving to gear-down position is permitted to circulate in the system via lines 18, 22, 45, port 38 and line 32. When the pump is delivering fluid oppositely, i.e., against the spring pressure of valve 39, the shuttle valve under pump pressure thru line 32 thereby moves to the extreme left position and pump pressure itself opens port 38, fluid then moving into the jacks via lines 45, 22 and 18 to retract the gear. In this gear movement, fluid already in the opposite ends of the cylinders is displaced upwardly thru lines 16 to line 20, then to line 42 which returns fluid thru valve 44 to storage via line 46. As will be observed valve 44 is a spring urged valve which is normally closed except when fluid pressure thru port 36 forces it open to permit fluid delivery thru line 42 for effecting movement of the gear downwardly under positive pressure. In this position of valve 44, it should be observed that line 46 simultaneously closes by the valve head moving from the right to the open left position.

When the gear is in fully retracted position, ball valve 39 returns to closing position since (as will more fully appear later herein) the pump shuts down. In so doing ball valve 39 serves to maintain the high pressure needed in the system for the support of the gear when retracted, there being no mechanical locking of the gear in the wells. As will be apparent upon full understanding of the overall system, the weight of the gear would otherwise displace fluid backwardly thru the system and return itself to extended position under its own weight.

At this point in the description, it may be observed that the apparatus described above when suitably connected electrically may be employed as a wholly manually operable hydraulic system by which the gears may be raised or lowered; and it is equally apparent that such a system is in no sense automatic. The portion of the apparatus which is now to be described goes more to the heart of the inventive system.

Referring again to FIG. 1, it will be seen that lines 48 and 50 with interposed valve 52 bridge between lines 20 and 22. Valve 52 is the aforementioned "critical" valve which may be seen as a working part of the pressure responsive device shown in FIGS. 2 and 3, which device will be described more fully later herein. In FIG. 1, the rod 53 shown associated with a simulated pressure responsive system corresponds to valve stem 53 of FIG. 3; also, lever 144 corresponds to the override element 144 of FIG. 2. From this it becomes apparent that valve 52 is manually movable for total pilot control regardless of the pressure device. For immediate understanding, it may be stated that valve 52 closes to the position shown at numeral 56 in FIG. 1 when differential ram pressure from the pitot-static device is that provided by the combined airspeed of approximately 85 m.p.h. and that of the slipstream delivered under full take-off throttle; and at the same time microswitch 209 (see FIGS. 2, 3 and 4) is closed, thus energizing the pump motor. (See also FIG. 4 where movable arm 212 is shown in disconnect position.) It is thus to be observed that unless or until the microswitch closes (i.e., across points 210 and 214, FIG. 4) the system is without effective hydraulic pressure for gear-up action and therefore the power system is entirely dependent upon the closing of valve 52.

Referring again to valve 52 and considering it in closed position, it will be observed that, in such position, the bridging lines 48 and 50 between lines 20 and 22 become dormant, or static, since there can be no flow of fluid in either direction past the closed valve. Thus, moving fluid must go to the jacks via one of lines 20 and 22. However, considering valve 52 in its open position, which means also that the pump is de-energized with no active pressure in the system and that fluid may then flow thru lines 48 and 50, it should become apparent that under pressure exerted by the piston heads fluid may be discharged. More particularly, precisely this occurs when the landing gear is in the up position. In such position the gear is so held solely by hydraulic pressure generated by the hydraulic pump. If then valve 52 opens due to lowering of ram pressure or otherwise (below 105 m.p.h. with power off and no slipstream from the propeller such occurs), then microswitch 209 opens to isolate the hydraulic pump. Since the fluid is free to move from one point to another via valve 52, the gear weight drives pistons 60 downwardly and the fluid out of the cylinders thru lines 18, 22, 48 and 50 into lines 20 and 16, on into the opposite end of the cylinders. At this point the gear is in down position under what is called automatic or emergency free-fall force.

With regard to the pump actuation for power gear-down movement of fluid thru line 42 (valve 52 being closed) (and now see also FIG. 4), winding 200 of the reversible motor is energized from bus 284 via the panel switch and it does not disconnect until the gear is in fully locked down position. Also, FIG. 4 reveals that actuation of the gear down panel switch breaks the circuitry for opposite winding 202 even though the microswitch 209 and valve 52 remain in closed position. More complete discussion of the circuitry is presented in relation to FIG. 4.

It will be appreciated that between the flying speeds of 85 and 105 m.p.h. the craft may be flown under power (i.e., throttle partly open with some effective pressure from the slipstream) at any intermediate speed, though slipstream pressure is less and less as idle setting is approached. In such cases, the pressure responsive device will automatically maintain valve 52 closed and the gear in up position (unless the pilot has activated the panel switch to its gear-down position thus reversing the pump direction to pressure the upper faces of pistons 60) so long as the combined pressure effect equals approximately that of 105 m.p.h. with power off. However, if airspeed falls below 85 m.p.h., whether it be airspeed pressure, or under less than full power, the pressure device is designed and adjusted to be incapable of maintaining valve 52 in closed position, at which point emergency free-fall of the gear occurs. Thus, in order to land a craft of the type under consideration with the gear up while equipped as above, the pilot must deliberately fly it into the ground, and also have failed to observe his responsibility for putting the gear down under power by mere throwing of panel switch. Such a landing is highly unusual, seldom necessary and hardly to be accounted for in any safety system which at the same time has already been warning the pilot by panel lights and horn that the gear is still in up position—as well as probable warning from the landing tower.

Before leaving FIG. 1, reference is made to pressure switch 205 shown connected to fluid line 45. As may be seen in FIG. 4, this switch is interposed in the circuitry between the squat switch 322 and microswitch 209. It is adjusted to close the circuit at pressures from line 45 via port 70 below 1100–1200 p.s.i. and disconnect at 1400–1500 p.s.i. Accordingly, when the system is pressured to the upper level, the circuit opens so that the pump is stopped. Normally a small amount of venting is provided in the hydraulic system and pressure transference device to avoid vacuum, and there may be a small amount of leakage in the overall. Thus, if pressure drops below about 1100 lbs., the pressure switch closes and internal pressure of the desired level is maintained so that the gear is not permitted to be in a state of periodic unwanted movement. As will be understood, the 1100 lb. lower pressure limit is well above normal pressure needed for operation and gear position maintenance. Thus, it is in no way critical except as to fulfill engineering needs of a particular retractable gear assembly.

Also in FIG. 1, numeral 72 denotes an adjustable high pressure valve (e.g. in a system as herein, 1600–2000 p.s.i.) which assures pressure relief should pressure build up on gear-up side of the pump. Numeral 74 denotes a similar valve on the gear-down side, though it is designed to relieve pressure at about 500–800 p.s.i. in the particular design since high pressure is unnecessary under "no load," i.e., in view of the gear weight. Numeral 76 denotes an adjustable thermal relief valve assuring against undue pressure from expansion effects. Of course, the valve may be set for opening as found to be necessary.

Figure 2:
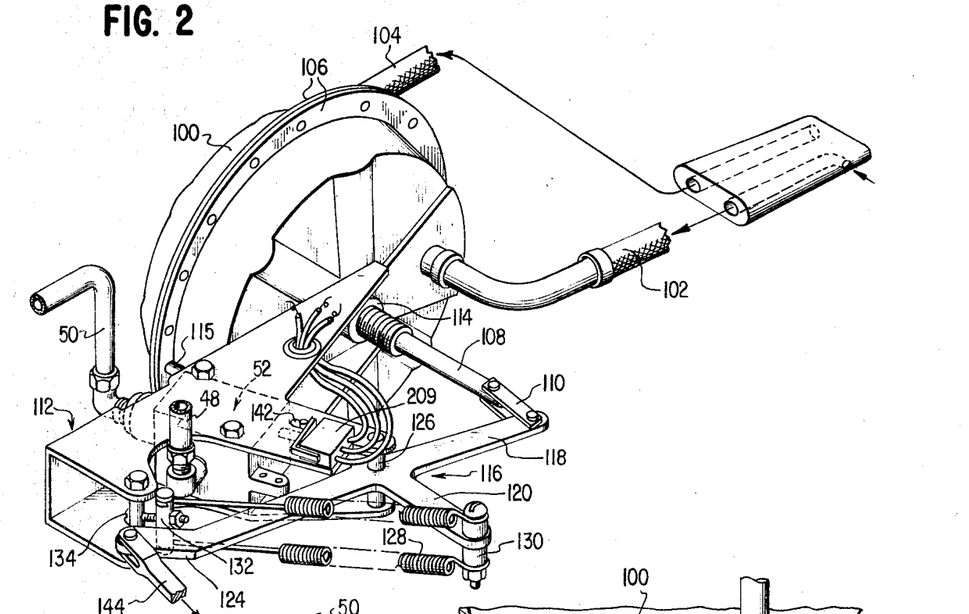
FIG. 2 is an illustration of the activating assembly including the pitot-static tube, pressure transference device, together with the associated "critical" valve and microswitch.
Figure 3:
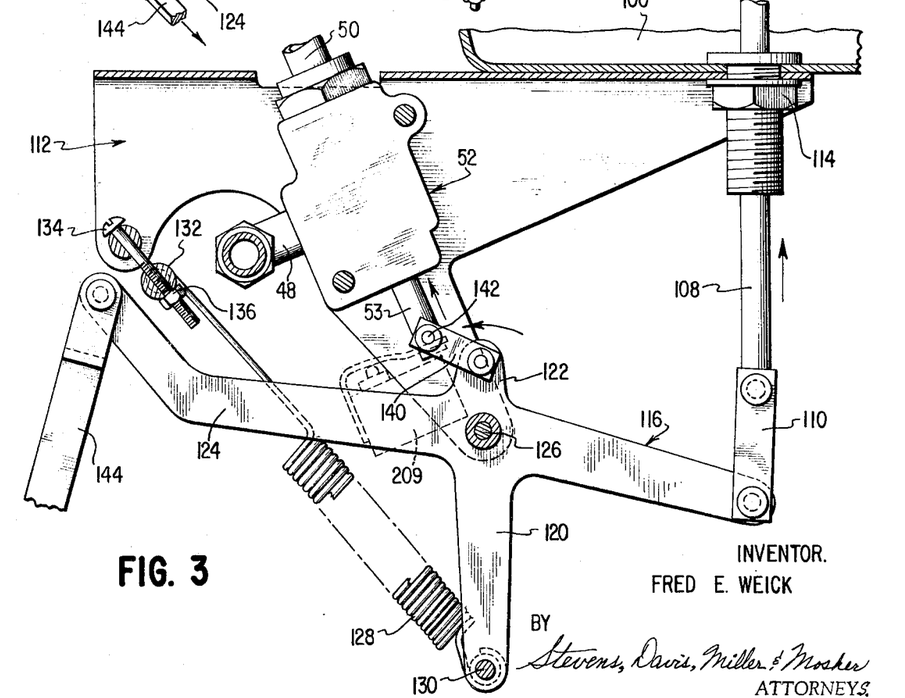
FIG. 3 is a view in horizontal section through a fragmentary portion of FIG. 2.
Figure 4:
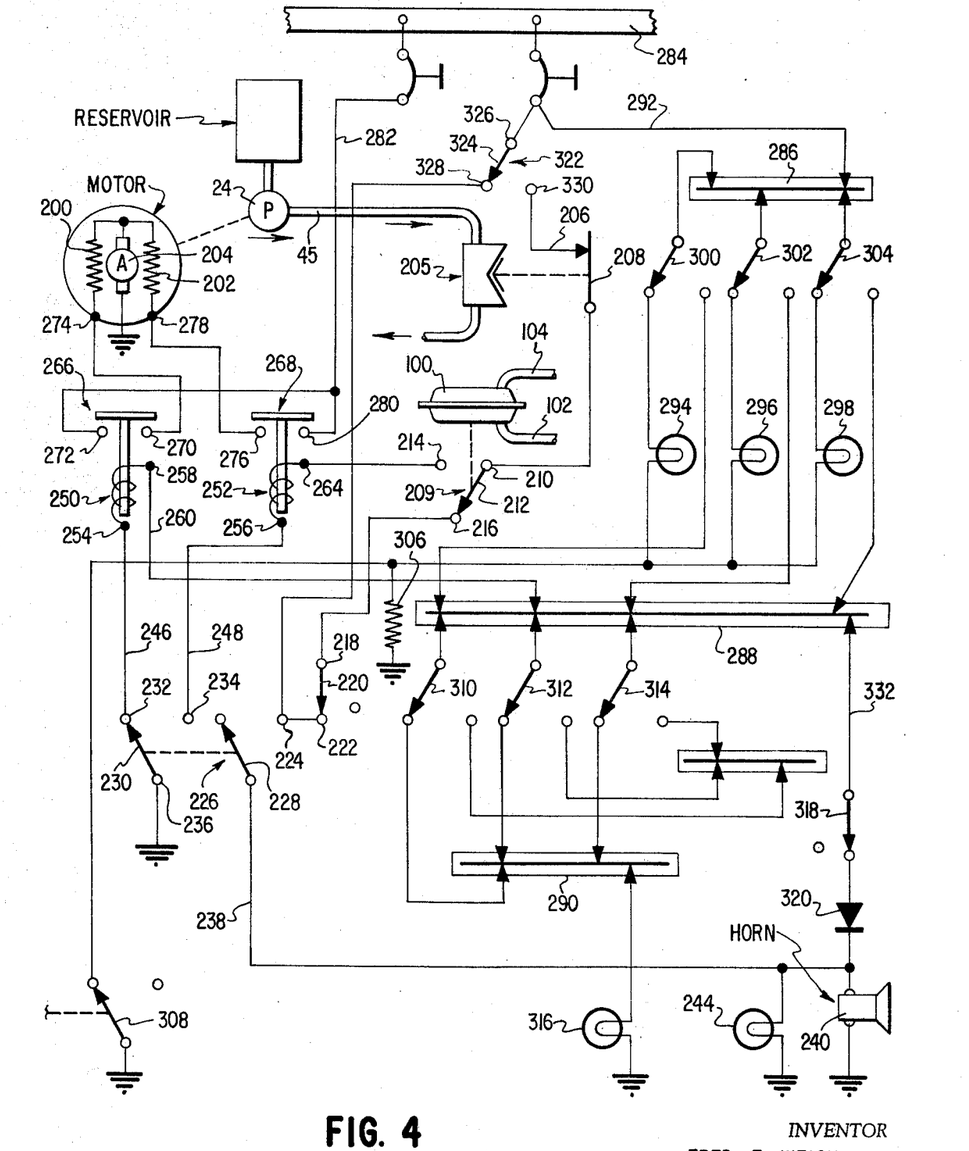
FIG. 4 is a circuit diagram with simulated operating parts associated therewith.

Reference is now made to FIGS. 2 and 3 which show with greater particularity the pressure transference device simulated in FIG. 1 together with the valve 52, and the associated microswitch, the latter being shown as an integrated part of the electric circuitry in FIG. 4.

Referring to FIGS. 2 and 3, numeral 100 designates a pressure chamber or housing by which the effective pressure generated by airspeed and slipstream is translated into mechanical motion and utilized as indicated hereinbefore. Numerals 102 and 104 denote pressure lines connecting with the pressure and static side of the pitot-static tube respectively, they leading to the interior of the pressure chamber. As may be seen in the drawings, the pressure chamber is composed of two sections which are connected together about the periphery of the annular flanges 106, between which flanges is held a flexible diaphragm movable in response to pressure changes. Numeral 108 denotes a shaft which connects with the diaphragm at the center thereof within the chamber, the passageway for the shaft being sealed by suitable bushings. As will be understood, as the diaphragm moves, so moves the shaft.

Numeral 110 denotes a connecting link pivotally associated with the shaft through which motion to the associated parts is given in response to the diaphragm movement.

Referring to the associated parts, numeral 112 denotes a base member designed for holding and interrelating the active parts of the arrangement. As may be seen, the base is held in position relative to the pressure chamber in the center thereof by a nut 114 and at the edge by connection 115. Securely mounted within the base framework is the valve, heretofore designated by numeral 52, and termed for convenience the "critical valve." As may be seen in the drawings, the stem 53 of this valve extends to the exterior thereof and lines 48 and 50 lead from the valve body as discussed in connection with FIG. 1. The remaining parts of the assembly interrelate the valve and microswitch 209 (also see FIG. 4) with diaphragm movement as delivered by way of shaft 108 through link 110.

Referring to these other parts, numeral 116 designates a valve and switch actuating crank pivotally mounted between the sides of the base. The actuating crank may be regarded as of the bell-crank type having arms 118, 120, 122 (FIG. 3) and 124 extending outwardly from pivot point 126, such being comprised of a bolt and associated bushings serving to secure the crank in position. The actuating crank is held against movement of the diaphragm pressure by a pair of springs 128 connected to the extremities of arm 120 as shown at numeral 130, the opposite ends of the springs being held by an anchor pin 132 which, in turn, is adjustably and firmly associated with the base 112. The manner of holding the anchor pin relative to the base is by way of bolt 134 and nut 136, the bolt first passing through the bolt 138 which bridges the sides of the base (and there held by a nut not shown in the drawings), the opposite end of the bolt 134 passing through a passageway in the anchor pin after which the nut 136 is applied. As will be appreciated, the arrangement provides for adjustment of tension on springs 128 simply by rotation of the bolt 134. As is apparent, movement of shaft 108 as sufficient pressure is applied on the diaphragm pivots the actuating arms accordingly against the spring tension; and as pressure on the diaphragm falls below the applied spring force, the crank is rotated oppositely.

Arm 122 is positioned slightly offset relative to the end of the valve stem 53 and is pivotally connected thereto via link 140. Link 140 is connected to the valve stem with a relatively long pin 142 which extends through the upper wall of the base 112 to a point in position for actuating the microswitch 209. As arm 122 moves through its arc in response to the diaphragm movement the valve stem 53 is moved to opened or closed position, and at the same time microswitch 209 is actuated to energize or de-energize the fluid delivery unit of the hydraulic system.

Arm 124 constitutes a lever by which the parts of the overall assembly may be manually actuated into any desired position regardless of pressure conditions. By suitable rods, linkages, or the like, fragmentary portions of which are seen in the drawings connected to arm 124 and denoted by numeral 144, an override means is provided for the pilot. The exact nature of the linkage or rod assembly will, of course, depend upon the location of the pressure transference arrangement relative to the pilot's seat. It is sufficient to indicate that the connecting and override actuating means leading to the pilot from arm 124 is located at a convenient point for the pilot and they provide him with a means for selectively rotating the entire crank about the central pivot 126 whereby to effect either closing or opening of the valve and switch, and also means for holding them in the position desired against the spring tension or against the pressure upon the diaphragm. In this manner the pilot is given complete control of the system, and he may make his choice as to gear positioning at any time. Thus, for example, should the pilot wish to make a very slow water-landing with the wheels up, the system as provided normally would already have extended the gear, since most certainly the pilot would not want to land a plane at a speed above 85 m.p.h. In such and similar instances, the override means permits the pilot to close the valve and actuate the microswitch, manual leverage replacing the force which normally actuates the system in response to airspeed and slipstream effects at the minimum conditions.

FIG. 2 includes a pitot-static tube having connecting openings lines 102 and 104, the pitot-static tube being located on the side of the fuselage, preferably on the pilot side where he may readily observe it for possible clogging conditions which position, of course, locates the device directly in the slipstream. Lines 102 and 104 lead through the fuselage wall and connect with the pressure chamber. As will be understood, the remainder of the hydraulic system is associated with the devices of FIGS. 2 and 3 via lines 48 and 50.

Before leaving FIGS. 2 and 3, additional discussion of the microswitch in relation to the pump motor is introduced for possible clarity as consideration is being given to the matter in the overall.

As will become more apparent in considering the electrical circuitry of the system which is later described herein, microswitch 209 activates only one winding of the reversible motor, that side being to effect motion to the pump in the direction sending fluid to the gear-up side of the hydraulic cylinders. The opposite side of the motor winding, which effects delivery of fluid oppositely, is separately energized whereby to effect power movement of the gear to extended position. Also, as will be seen from the circuit diagram and discussion thereof, microswitch 209 (together with other circuitry elements) completes a second circuit involving the alarm signals when it is in a position de-energizing the motor winding. As will be understood, the various alarms and signals and their manner of actuation are not critical in the sense of being essential features of the basic invention. On the other hand, the manner of integrating the alarms and signals in the system circuitry as herein shown provides a highly reliable and effective arrangement for actual use.

Having discussed the hydraulic system in relation to function and association with the various important elements, a discussion of suitable electric circuitry is now presented, the object of such circuitry being to carry out the basic requirement to the ends sought, while also associating the invention-needed circuit means with appropriate adjuncts serving to enhance the installation in various respects.

FIG. 4 is a schematic illustration of wiring including certain parts applicable to the hydraulic system. This illustration shows the circuitry when the craft is on the ground. Referring to this figure, a reversible motor and associated pump are shown including separately energizable field windings 200 and 202 and armature 204. Winding 200 effects fluid movement for powered gear down position and winding 202 effects fluid movement for taking the gear up. Numeral 100 designates the pressure transference device illustrated in FIG. 2, the vertical dotted line corresponding to the actuating means for microswitch 209. Numerals 206 and 208 designate respectively the stationary pole and movable contact of the pressure limit switch as seen in FIG. 1.

Microswitch 209 includes stationary pole 210 and contact arm 212 movable between contact poles 214 and 216. Numeral 218 denotes the stationary contact pole of a single pole, single throw throttle associated switch, numeral 220 denoting a contact arm making connection thru contact post 222 thru to contact post 224 of panel mounted gear selector switch 226. Switch 226 involves movable contact arm 228 and movable contact arm 230, the latter effecting selective ground connection for stationary poles 232 and 234 by way of grounded pole 236. Contact arm 228 via contact post 224 and line 238 completes the circuitry to horn 240 and red panel light 244.

Stationary poles 232 and 234 effect connection via lines 246 and 248 to solenoids 250 and 252 thru contacts 254 and 256. The other contact 258 of solenoid 250 is connected via line 260 to bus bar 288, to be described later. Contact post 264 of solenoid 252 is directly connected to contact 214 of the microswitch.

Solenoids 250 and 252 respectively open switches 266 and 268. Switch 266 includes contacts 270 and 272, contact 270 leading to winding 200 at connection 274, contact 276 of switch 268 leading to winding 202 at contact 278. Pole 272 of the solenoid operated switch 266 is connected to pole 280 of solenoid operated switch 268, line 282 leading from pole 280 to make connection with main bus bar 284.

Numerals 286, 288 and 290 designate sub buses. The bus 286 is connected to main bus 284 via line 292. Panel mounted green lights 294, 296 and 298 are connected in parallel to bus 286 via single pole, double throw switches 300, 302 and 304 in the position shown in the drawings, the other side of the green lights circuitry going to ground via resistor 306, there being connected in parallel therewith an instrument light switch 308 shown as a single pole, single throw switch and which may be integrated with other switching and circuitry. In the other positions of switches 300, 302 and 304, bus 288 is connected to bus 286, either one of said switches when in the said other position being sufficient for the connection. In consequence of energizing bus 288, voltage is applied to line 260, making it possible to energize solenoid 250 via gear selector switch 226 thru contacts 232 and 236.

Also connected to bus 288 is bus 290 via single pole, double throw switches 310, 312, and 314, which in the position shown in the drawings effects lighting of panel mounted yellow indicator light 316, which light is connected between bus 290 and ground under conditions such that bus 288 is in fact energized by any one of switches 300, 302 and 304. Horn 240 and red indicator light 244 are connected between ground and bus 288 via single pole, single throw switch 318 and series diode 320.

Numeral 322 denotes the so-called "squat switch" which is of the single pole, double throw type having movable contact arm 324 making connection between post 326, and stationary poles 328 and 330. In the position shown in FIG. 4, the aircraft is on the ground thus breaking otherwise possible electrical continuity between main bus 284 and solenoid 252 and rendering it impossible to attempt to take the gear up until the craft is airborne, regardless of conditions of the circuitry and hydraulic system otherwise. Moreover, as will be seen, movement of the panel switch to gear-up position closes the circuitry leading from post 228 to red light 244 and horn 240, thus giving warning of improper and/or unsafe conditions for gear-up position. When the craft becomes airborne arm 324 of the squat switch moves to post 330, thus applying voltage for gear-up operation. When pressure has built up in the pressure transference chamber 100 sufficient to effect movement of contact arm 212 to post 214, solenoid 252 can then be actuated by the panel switch 226, connection thru post 234 being made to ground. Until this connection is made, however, the gear remains in down, locked position since the pump motor is not energized. At this point, mention is made of the fact that winding 200 is energized from bus 288, which in turn is energized from bus 286 by either of switches 300, 302 or 304. These switches are actuated by gear position. More particularly the switches are in the position shown in the drawings only when the gear is in locked, down position, the green lights then showing as indication of such locking. Thus, if any gear remains unlocked, electrical continuity remains thru to winding 200 and the pump will continue to function.

Concerning gear-up well position, the following discussion is applicable in relation to the circuitry. Bus 288 is connected with bus 290 via switches 310, 312 and 314, any one of which is also sufficient for electrical continuity thru to yellow light 316. Switches 310, 312 and 314 are in the position shown in the drawings at all times excepting in full gear-up position, these switches being actuated to the alternate positions by gear movement at the extreme and proper up position. Consequently so long as any wheel remains in an in-transit position, whether when moving upwardly into the wells or downwardly i.e., at a halted position in between "full up" or "full down," electrical continuity to the yellow light exists and it continues lighted to give notice of the gear condition. Of course, when the gear has reached full up position, switches 310, 312 and 314 will then be in disconnect position, meaning that the gear is in the proper place. Further, when the gear is securely locked in down position, the yellow light is disconnected via switches 300, 302 and 304.

As will be observed, throttle switch 318 is interposed between red light 244 and horn 240, line 332 delivering voltage from bus 288, which is energized at all times excepting in gear locked down position. Throttle switch 318 is opened and closed by throttle movement and it is intended to effect the lighting of the red light and sounding of the horn when the throttle is pulled back, as for landing, until the gear has been extended. It will be appreciated that this throttle switch may be adjusted to accomplish such warnings at any desired throttle position, i.e., below any selected engine power.

It is believed that the invention and its manner of operation according to the various flight circumstances that occur has been made clear from the foregoing discussion, both in a general and specific sense. Therefore, it is not felt that additional detailed comments are needed by way of explanation. However, in order that the invention will not be perceived in unduly limited conception, some saving comments are presented below. Also such comments may be helpful in adapting the invention to particular installations according to a variety of considerations.

It is desired to emphasize that the invention herein in its overall breadth is regarded as an aircraft control system wherein the pressure effects of airspeed and slipstream are combined by way of a suitable means and impressed upon a gear actuating arrangement in such manner as to assist in controlling the gear actuating means and more certainly assure its correct position at critical points in the handling of the craft. As will be understood, pressure effects from the slipstream are directly related to applied engine power. The desirability of providing a system responsive to varying applied engine power, together with responsiveness to varying airspeed is not a new approach to the problem discussed herein. However, the various elements and system means and methods herein taught by which such responsiveness is combined are not believed to have been conceived or taught heretofore. As will be understood, various specific actuating and gear operating means may be adapted to utilize the airspeed-slipstream effects and it is not to any extent considered that the particular pressure sensing means or pressure translating means, either alone or in combination are critical in the practicing of the invention. Similarly, it is not considered essential that the pressure effects be translated and utilized by any particular actuating mechanism or system. In other words, the invention does not require that the effects be delivered to hydraulic systems, as should be obvious. For example, the system might be totally electric or a different combination of electric and hydraulic from that disclosed herein. Additionally, the invention is not considered to require that the effects be translated to perform any established or set pattern of gear operation. For example, the effects may be employed to assure only one accomplishment in the overall gear operation, or the effects may be employed to accomplish any pattern of gear motion, together with other aircraft flight control adjuncts. It should be obvious that in indicating gear operation relative to 85 m.p.h. and 105 m.p.h. is merely illustrative of a suitable embodiment of the invention. Therefore, the various pressure elements may be related and interrelated in any desired way to achieve responsiveness of the system according to the desires and needs of particular craft and installations.

Further, it is desired to point out that the system is not restricted to the use of a single pressure sensing device, that is to say, a single pitot-static tube or the like. For example, the system may be designed to employ a plurality of such means on a single engine craft; and it should be observed that the system as taught herein is applicable to multi-engine craft for example, twin-engine craft.

It should be noted that the system is readily adjustable within reasonable limits to various environmental locations and flight conditions. In this general respect it may be remarked that in practice the pitot-static tube can be provided with heating means as well as orifice screening means which also may be heated whereby to provide assurance against ice clogging and the like.

Aside from the foregoing comments concerning substitutions and equivalents it may be mentioned that various modifications and additions may be made to the system to render its condition positively ascertainable. For example, pressure monitor means together with alarm means may be inserted where such are desired.

Insofar as location of the exterior pitot-static tube or the like, such is technically not a critical matter. On the other hand, as a general matter, it is preferable to locate the tube in a position such as it is least likely to encounter damage and also so as to permit observation. It's position may desirably vary with aircraft shape. Obviously, where the system is applied to a twin engine craft, the most effective location for such device would need to be determined accordingly. Plainly, the device is most advantageously employed where the slipstream effect is more pronounced and constant, though some compromise may be necessary in different installations.

It should not be overlooked that the pitot-static tube may advantageously be controlled for particular purposes by means directly connected therewith and available for manual operation by the pilot. For example, means may be employed in connection with either the pressure or static port or channel effective upon gear position. Further, either port may be controlled by means automatically responsive to velocity effects. Thus, either port may be restricted, constricted or completely alternately opened or closed as a further selective control upon the system. The possibilities and conceivable desirability for such additional and/or different control is considered to be understandable from the teachings herein.

The rapidity of gear response is readily controllable in a hydraulic system as herein described by providing restrictive fluid orifices in the hydraulic lines at critical points. For example, the speed or gear-down motion is regulatable or set by simple restriction in fluid to the cylinders at the point of entry thereto.

Before concluding, it is desired to re-emphasize that the means for receiving or "sensing" the airspeed-slipstream effects may be of any type, the only necessity being that it is capable of impressing or delivering a useful force output that changes with changes in the received effects. Thus, the devices may be of the specific or general type herein, or it may be of an entirely different type such as a mechanical device, e.g., a rotating vane delivering force according to rotation. Further, it may be such as a lever arm located in position to receive the effects and deliver them mechanically from its working end. Also, the device may be electrically responsive to pressure or velocity changes. The means herein employed are found to be outstandingly adapted to the objects, but they are in no event exclusive.

What is claimed is:

1. In a retractable type aircraft landing gear system wherein engine power output and airspeed are employed as effects associated therewith to retract and/or extend said gear, the improvement which comprises means as a part of said system located in the path of a propeller slipstream responsive to air velocity effects, whereby said engine power output is received as air velocity effects by said means and usefully impressed upon said system in the said retracting and/or extending operation.

2. A system as claimed in claim 1 wherein said means is at least potentially effective upon said system according to a predetermined take-off flying speed and said gear normally remains extended therebelow.

3. A system as claimed in claim 2 wherein said means is also effective in said system to maintain said gear in retracted position during flight under normal flight conditions under substantial engine power and withdraws its applied effectiveness in said system at a predetermined point as flying speed falls following the reduction of said power, whereby said gear no longer effectively supported in retracted position by the internal system and said gear gravity falls to extended position.

4. A system as claimed in claim 3 wherein there is contained therein an apparatus element upon which said effects are impressed which element functions as an essential component to conditions said system for said retracting and/or extending operations.

5. A system as claimed in claim 4 which is hydraulic and wherein said element is a valve that is opened and closed to the flow of hydraulic fluid in said system, and said system responds to said effects depending upon the open and/or closed position of said valve, which position is determined by the first said means.

6. A system as claimed in claim 5 wherein the said valve is operably related to a supplemental means under the control of the pilot whereby said valve operation may be overridden and gear position determined according to pilot choice without regard to airspeed-slipstream effects.

7. A system as claimed in claim 2 wherein the craft is provided with means for overriding the effects of the first said means whereby the gear may be positioned according to pilot demands irrespective of airspeed-slipstream effects.

8. A system as claimed in claim 3 wherein the craft is provided with means for overriding the effects of the first said means whereby the gear may be positioned according to pilot demands irrespective of airspeed-slipstream effects.

9. A system as claimed in claim 1 wherein there is contained therein an apparatus element upon which said effects are impressed, which element functions as an essential component to condition said system for said retracting and/or extending operations.

10. A system as claimed in claim 9 which is hydraulic and wherein said element is a valve that is opened and closed to the flow of hydraulic fluid in said system, and said system responds to said effects depending upon the open and/or closed position of said valve, which position is determined by the first said means.

11. A system as claimed in claim 10 wherein the said valve is operably related to a supplemental means under the control of the pilot whereby said vlave operation may be overriden and gear position determined according to pilot choice without regard to airspeed-slipstream effects.

12. A system as claimed in claim 1 wherein said means is effective in said system to maintain said gear in retracted position during flight under normal flight conditions under substantial engine power and withdraws its applied effectiveness in said system at a predetermined point as flying speed falls following the reduction of said power, whereby said gear no longer is effectively supported in retracted position by the internal system and said gear gravity falls to extended position.

13. A system as claimed in claim 12 wherein the craft is provided with means for overriding the effects of the first said means whereby the gear may be positioned according to pilot demands irrespective of airspeed-slipstream effects.

14. A system as claimed in claim 1 wherein the craft is provided with means for overriding the effects of the first said means whereby the gear may be positioned according to pilot demands irrespective of airspeed-slipstream effects.

15. A hydraulic system for retracting and extending aircraft landing gear comprising
 (1) hydraulic jacks or cylinders related to said gear for movement to normal positions,
 (2) hydraulic lines leading to the retraction side of said cylinders connected with delivery means, and similar lines and delivery means for the extension side of said gear,
 (3) said jacks, lines and delivery means consituting a closed hydraulic system, (4) selectively energizable means for pressuring said system according to desired gear position,
(5) a fluid line bridging across said lines of item (2) (supra) between their points of entry to said cylinders and said delivery means, said bridging line having valve means therein operable to open and close to the flow of fluid therethrough,
(6) means responsive to airspeed and propeller slipstream movement controlling the position of said valve,
(7) whereby said valve is closed following take-off at a predetermned attained flying speed and said gear retracts and maintains such position for normal flight,
(8) and whereby said valve opens at a predetermined flying speed in landing as power is reduced and slipstream effects diminish,
(9) following which said gear gravity falls to extended locked position.

16. A system as claimed in claim 15 wherein the means for delivering power during gear retraction is actuated simultaneously with said valve closing, and deactivated by its opening.

17. A system as claimed in claim 15 wherein a pressure receiving device is employed as a means to transfer said airspeed-slipstream effects to said valve; said valve having means associated therewith adapted to convert the pressure force from said pressure receiving means to mechanical motion and thereby utilize said motion to the operation of said system.

18. A system as claimed in claim 17 wherein means is provided for pilot use for overriding the pressure means by which said valve is operated whereby its position may be pilot-determined according to choice.

References Cited
UNITED STATES PATENTS

| | | | |
|---|---|---|---|
| 2,342,184 | 2/1944 | Fawcett. | |
| 2,401,097 | 5/1946 | Parilla | 244—102 |
| 2,500,457 | 3/1950 | Hess. | |
| 2,647,708 | 8/1953 | Haverlin | 244—102 |

MILTON BUCHLER, Primary Examiner

P. E. SAUBERER, Assistant Examiner